(12) United States Patent
Deane et al.

(10) Patent No.: US 10,677,167 B2
(45) Date of Patent: Jun. 9, 2020

(54) FUEL MANIFOLD WITH INTEGRALLY FORMED RETAINER FOR A PILOT NOZZLE IN A COMBUSTOR OF A GAS TURBINE ENGINE

(71) Applicant: Siemens Aktiengesellschaft, Munich (DE)

(72) Inventors: Erick J. Deane, Fort Mill, SC (US); Miguel Bascones, Oviedo, FL (US); Charalambos Polyzopoulos, Orlando, FL (US); Abhijeet Tiwary, Orlando, FL (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 286 days.

(21) Appl. No.: 15/388,155

(22) Filed: Dec. 22, 2016

(65) Prior Publication Data

US 2018/0179957 A1    Jun. 28, 2018

(51) Int. Cl.

| | |
|---|---|
| *B22C 9/10* | (2006.01) |
| *F02C 7/22* | (2006.01) |
| *F23R 3/34* | (2006.01) |
| *F23R 3/28* | (2006.01) |
| *B22D 25/02* | (2006.01) |

(52) U.S. Cl.
CPC .............. *F02C 7/222* (2013.01); *B22C 9/103* (2013.01); *B22D 25/02* (2013.01); *F23R 3/283* (2013.01); *F23R 3/343* (2013.01); *F05D 2220/32* (2013.01); *F05D 2230/21* (2013.01); *F05D 2230/31* (2013.01); *F23R 2900/00018* (2013.01)

(58) Field of Classification Search
CPC ....... F02C 7/222; F23R 3/283; F05D 2230/21
See application file for complete search history.

(56) References Cited

U.S. PATENT DOCUMENTS

| | | | |
|---|---|---|---|
| 4,930,703 A | 6/1990 | Ford et al. | |
| 7,197,877 B2 | 4/2007 | Moraes | |
| 8,220,272 B2 * | 7/2012 | Hall ........................ | F23R 3/283 60/39.463 |
| 8,381,532 B2 * | 2/2013 | Berry ........................ | F01D 9/06 60/751 |
| 9,163,841 B2 | 10/2015 | Ramier et al. | |
| 9,216,451 B2 | 12/2015 | Lee et al. | |
| 9,366,439 B2 * | 6/2016 | Melton ..................... | F23R 3/10 |

* cited by examiner

*Primary Examiner* — Arun Goyal

(57) ABSTRACT

A fuel manifold (10) configured to form a base support structure (12) to support a plurality of fuel nozzles (14) including a pilot fuel nozzle is provided. A restraining element (30) is arranged in the base support structure (12) to support the pilot fuel nozzle. Restraining element (30) is integrally formed with the base support structure. The restraining element being integrally formed with the base support structure is effective to arrange for an incremental thickness (34) in a portion (39) of a wall (34) interposed between the inner diameter (36) of restraining element (30) and respective proximate edges (40) of a number of pilot bolt holes (32) disposed around the restraining element.

2 Claims, 6 Drawing Sheets

US 10,677,167 B2

FUEL MANIFOLD WITH INTEGRALLY FORMED RETAINER FOR A PILOT NOZZLE IN A COMBUSTOR OF A GAS TURBINE ENGINE

FIELD OF THE INVENTION

Disclosed embodiments are generally related to a combustion turbine engine, and, more particularly, to a structure forming a fuel manifold and a base support structure including an integrally formed retainer for a pilot nozzle.

BACKGROUND OF THE INVENTION

A combustion turbine engine, such as a gas turbine engine, includes for example a compressor section, a combustor section and a turbine section. Intake air is compressed in the compressor section and then mixed with fuel, and a resulting mixture of air and fuel is ignited in the combustor section to produce a high-temperature and high-pressure flow of combustion gases conveyed to the turbine section of the engine, where thermal energy is converted to mechanical energy. A fuel manifold and a base support structure for supporting fuel nozzles may be involved for injecting fuel into the combustor section. See for example U.S. Pat. No. 9,163,841 titled "Cast Manifold For Dry Low Nox Gas Turbine Engine", which describes a dual fuel manifold integrally cast with the base support structure for supporting the fuel nozzles.

BRIEF DESCRIPTION OF THE DRAWINGS

The invention is explained in the following description in view of the drawings that show.

DETAILED DESCRIPTION OF THE INVENTION

Figure 1:
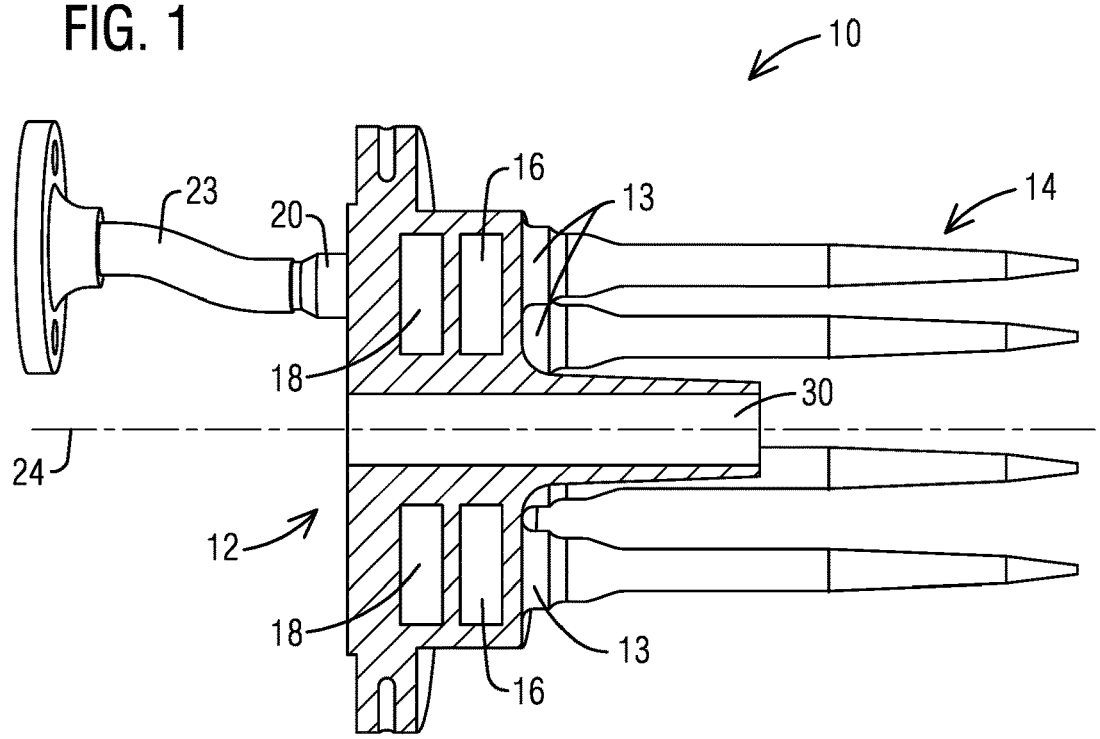
FIG. 1 shows a partial section view of one non-limiting embodiment of a disclosed fuel manifold configured to form a base support structure to support a plurality of fuel nozzles in a combustor of a gas turbine engine.

The present inventors have recognized various issues in connection with certain known fuel manifolds including a base support structure for supporting fuel nozzles (e.g., a pilot fuel nozzle and main fuel nozzles) in the combustor section of the combustion turbine engine. For example, the base support structure may involve closeout fittings that are separate and distinct structures from the base support structure. The closeout fittings provide a means for connecting to respective fuel feeding tubes that supply, for example, gas fuel to respective stages in a fuel manifold formed in the base support structure. The closeout fittings may comprise machined structures that may be welded, such as by way of fillet welding joints, to the nozzle support structure to establish the respective connections with the fuel feeding tubes. The involved machining and welding for affixing such fitting components to the base support structure adds to manufacturing complexity and costs. For example, one issue that can arise in fillet welded joints is being able to consistently achieve the appropriate weld size relative to the involved leg lengths and/or throat thicknesses of the structures being joined to one another. To deal with this issue, the designer may typically call for a built-in life-limiting safety factor associated with the filet welded joint.

Known base support structures for supporting the fuel nozzles may further incorporate a restraint element that is separate and distinct from the base support structure. The restraint element provides a means for supporting the pilot fuel nozzle and allows positioning the pilot fuel nozzle while appropriately controlling the natural frequency of the pilot fuel nozzle. The present inventors have recognized that incorporating this separate restraint element in known base support structures may involve assembly actions that may be time consuming and burdensome. For example, in a shrink-fitting assembly process, the restraint may be exposed to liquid nitrogen, other appropriate cold substance, or a reduced temperature condition to reduce the temperature of the restraint. The temperature of the restraint is lowered to such an extent so that the outer diameter of the restraint is reduced to less than the inside diameter of an orifice constructed in the base support structure for receiving the restraint. The restraint may then be inserted into the orifice in the base support structure to establish an appropriate interference fit when the restraint returns to a normally higher operating temperature, for example. Alternatively, the temperature of the base support structure may be raised to increase the size of the orifice so that the restraint may be inserted into the orifice. Regardless of the specific methodology for assembling this separate restraint element in known base support structures, this assembly adds to manufacturing complexity and costs.

The present inventors have further recognized that a casting process currently used for constructing a fuel manifold in known base support structures utilizes a core packing technique that involves the formation of several holes in the body of the base support structure. These holes function as core print holes during the casting process. However, upon completion of the casting process, these holes are extraneous and their presence would be counter effective to the operation of the fuel manifold, and consequently must be plugged with appropriate sealing plugs, such as metal cylindrical plug structures that are welded, to seal, for example, a fuel gas side from an air side. The plugging operation of these extraneous holes adds manufacturing cost and complexity for making such base support structures. Also in the casting process currently used for constructing the fuel manifold, the fuel galleries are not accessible on the rocket base side of the base support structure, thus involving relatively substantial machining operations to access the fuel galleries from the base rocket side of the base support structure.

At least in view of the foregoing considerations, the present inventors propose in disclosed embodiments, an innovative manifold, such as without limitation a cast manifold, including fuel feed bosses that are formed as an integral cast feature of an improved base support structure for supporting the fuel nozzles in the combustor section of the combustion turbine engine. The integral fuel feed bosses in the proposed cast structure allow for a cost-effective and a simplified design conducive to reducing manufacturing costs and complexity. For example, the integral fuel feed bosses in the proposed cast structure allow eliminating the above-discussed fillet welded joints and thus avoid a need for requiring the built-in life-limiting safety factor associated with the filet welded joints involved in known base support structures.

Additionally, the present inventors propose in disclosed embodiments, forming the pilot nozzle restraint as an integral cast feature of the improved base support structure. In addition to reducing assembly costs, since the above-discussed shrink-fitting assembly is no longer needed, the proposed cast structure—where the pilot nozzle restraint is formed as an integral cast feature of the base support structure—is conducive to increasing the low cycle fatigue life (LCF) in the neighborhood area of the pilot bolt holes that are located proximate to the restraint. This is because forming the restraint as an integral cast feature is conducive to an incremental structural thickness of a wall neighboring such pilot bolt holes.

Lastly, the present inventors propose in disclosed embodiments an improved casting process for constructing the fuel manifold in the proposed cast structure. In this improved casting process, ceramic cores may be appropriately arranged in conduits defined by the fuel feed bosses and/or the rocket bases in the improved base support structure. Upon completion of the casting process, these ceramic cores may then be removed (e.g., by leaching out) through such conduits in the rocket bases and/or the fuel feeds. This avoids formation of extraneous holes in the body of the cast manifold and the concomitant hole-plugging operations for such holes, which is beneficial for further reducing manufacturing costs.

Although the disclosure below refers to a cast manifold, it will be appreciated that such a disclosure should not be construed in a limiting sense. For example, other manufacturing technologies could be employed in alternative embodiments depending on the needs of a given application. For example, three-dimensional (3D) Printing/Additive Manufacturing (AM) technologies, such as laser sintering, selective laser melting (SLM), direct metal laser sintering (DMLS), electron beam sintering (EBS), electron beam melting (EBM), etc., may also be conducive to cost-effectively making disclosed fuel manifolds, such as may involve complex geometries and miniaturized features and/or conduits. For readers desirous of general background information in connection with 3D Printing/Additive Manufacturing (AM) technologies, see, for example, a textbook titled "Additive Manufacturing Technologies, 3D Printing. Rapid Prototyping, and Direct Digital Manufacturing", by Gibson I., Stucker B., and Rosen D., 2010, published by Springer, and this textbook is incorporated herein by reference.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

FIG. 1 shows a partial section view of one non-limiting embodiment of a disclosed manifold 10, such as a cast manifold or a three-dimensionally printed manifold, configured to form a base support structure 12 to support, for example, on respective rocket bases 13 a plurality of fuel nozzles, such as main fuel nozzles 14, for injecting fuel in a combustor of a gas turbine engine. In one non-limiting embodiment, a fuel manifold includes a first stage fuel gallery 16 and a second fuel stage gallery 18 constructed within base support structure 12.

Figure 2:
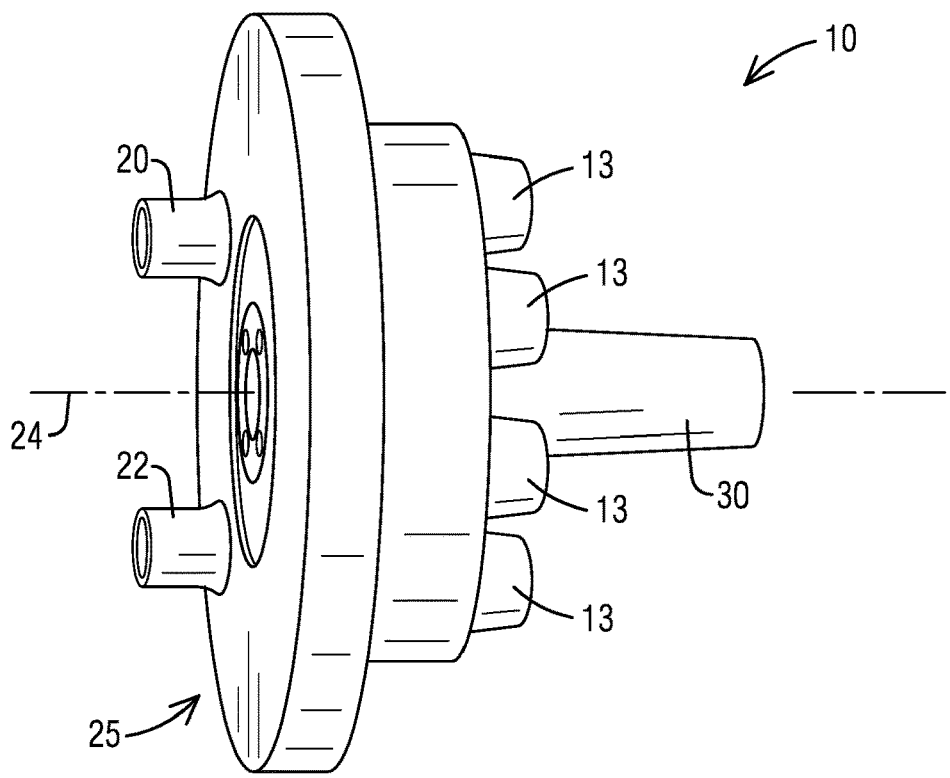
FIG. 2 shows a side isometric view of one non-limiting embodiment of a disclosed fuel manifold illustrating fuel feed bosses integrally formed with the base support structure.

A fuel feed boss 20 (e.g., a protuberance) is configured to connect to a first tube 23 arranged to deliver gas fuel to first stage fuel gallery 16. As may be appreciated in FIG. 2, another fuel feed boss 22 is configured to deliver gas fuel to second stage fuel gallery 18. Similar to the arrangement described above, fuel feed boss 22 is configured to connect to a second tube (not shown) arranged to deliver gas fuel to second stage fuel gallery 18. Fuel feed boss 20 and fuel feed boss 22 is each integrally formed with the base support structure. This integral construction advantageously allows fuel manifold 10 to be free of weld joints that otherwise would be needed for affixing separate fuel feed bosses to base support structure 12.

In one non-limiting embodiment, fuel feed bosses 20, 22 may extend along a longitudinal axis 24 of fuel manifold 10. As may be appreciated in FIG. 5, fuel manifold 10 may form a round backside 25 (e.g., cylindrical-shaped backside) and fuel feed bosses 20, 22 may be disposed on opposite ends of an imaginary secant line 26 that defines an arc segment 28 of the round backside 25 of fuel manifold 10.

As may be appreciated in FIG. 1, in one non-limiting embodiment a restraining element 30 is arranged in base support structure 12 to support a pilot fuel nozzle (not shown). Restraining element 30 is integrally formed with base support structure 12. As elaborated in greater detail below, forming restraining element 30 as an integral cast feature is conducive to enhancing the structural integrity of fuel manifold 10. As can be appreciated in FIG. 2, restraining element 30 extends along a longitudinal axis 24 of fuel manifold 10 at a distance protruding beyond the respective tips of the rocket bases 13 that support the main fuel nozzles 14 (FIG. 1).

Figure 3:
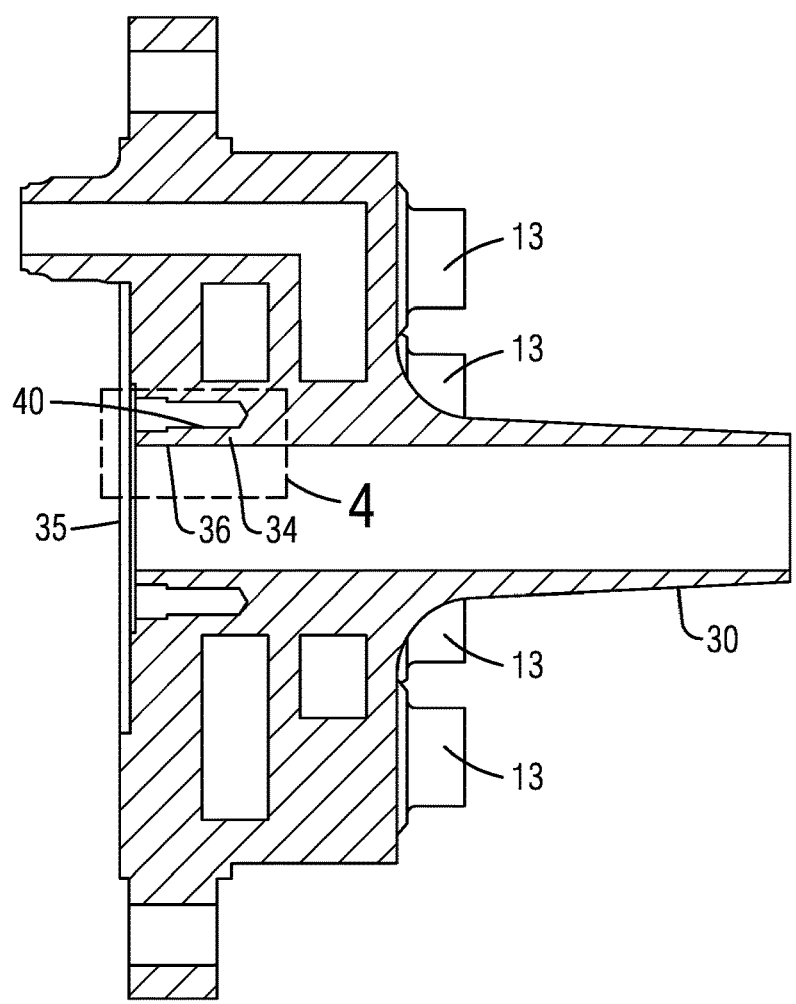
FIG. 3 is a cross-sectional view of one non-limiting embodiment of a disclosed fuel manifold along a cutting plane line 3-3 in FIG. 5.
Figure 4:
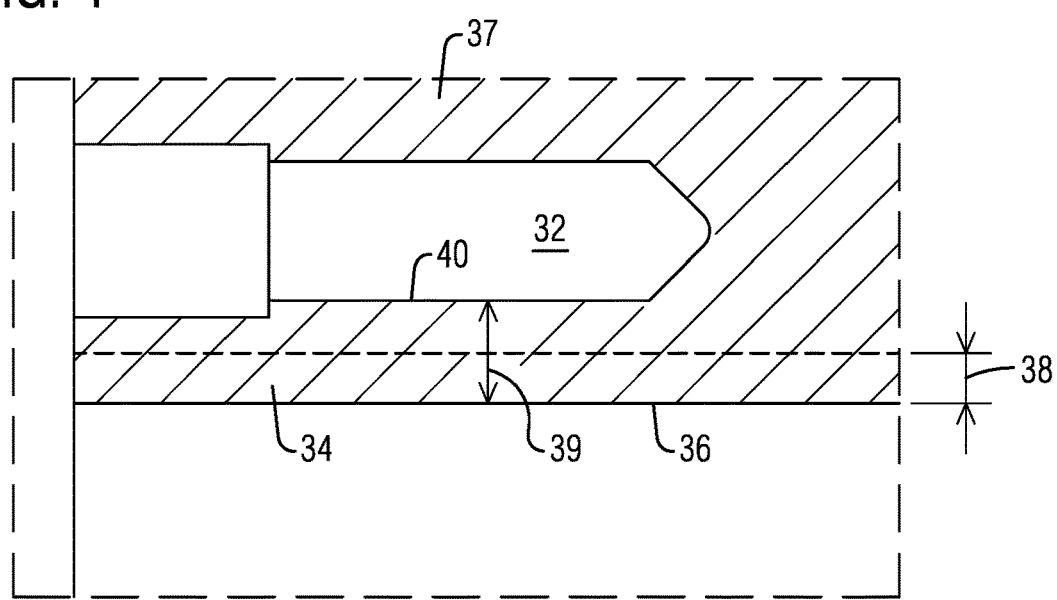
FIG. 4 shows an inset illustrating a zoomed-in view of an excerpt of FIG. 3.
Figure 5:
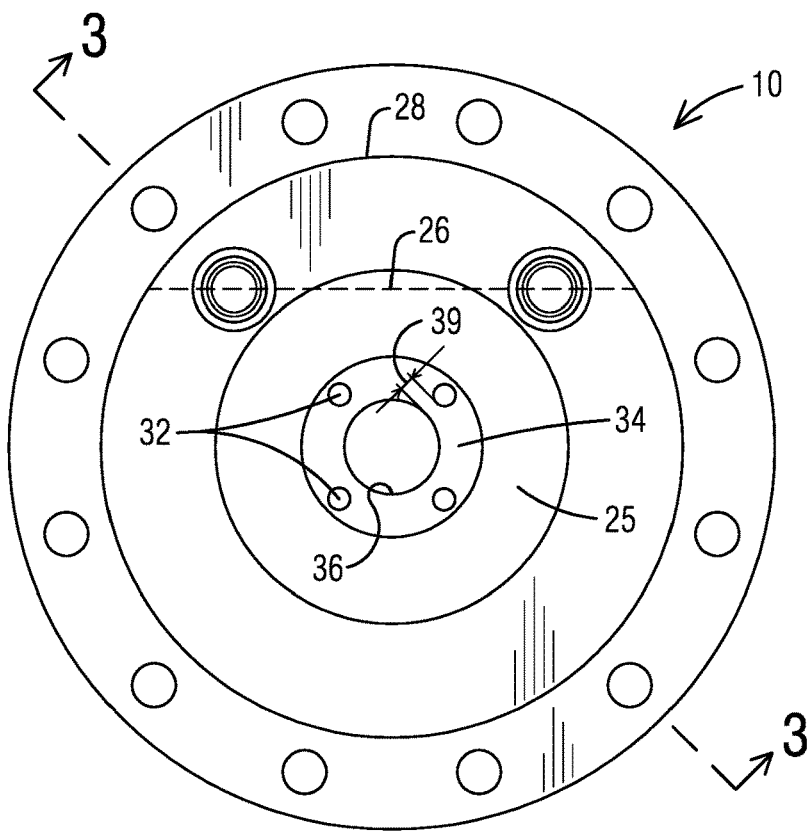
FIG. 5 shows an end view of one non-limiting embodiment of a disclosed fuel manifold.
Figure 6:
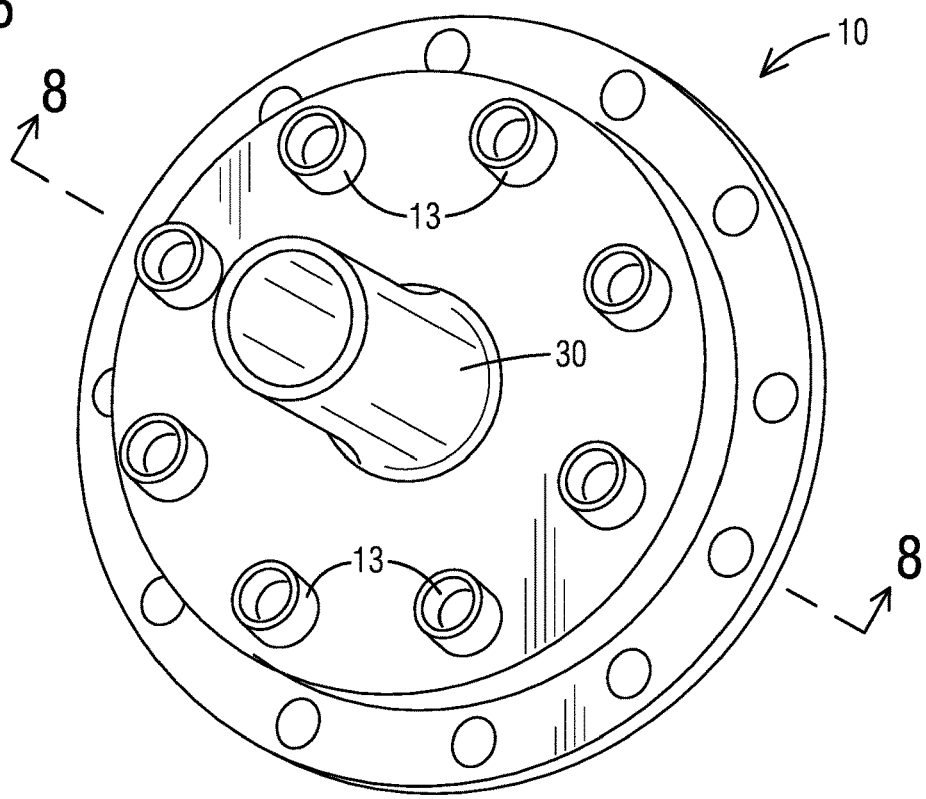
FIG. 6 shows a front isometric view of one non-limiting embodiment of a disclosed fuel manifold illustrating a pilot nozzle restraining element integrally formed with the base support structure.

More particularly, as may be appreciated in FIG. 5, a plurality of pilot bolt holes 32 may be disposed around restraining element 30. In one non-limiting embodiment, base support structure 12 defines a circumferentially-extending wall 34 between an inner diameter 36 of restraining element 30 and the pilot bolt holes 32 around restraining element 30. Since restraining element 30 is integrally formed with base support structure 12, this is effective to arrange for an incremental thickness 38 (better appreciated in an inset 37 illustrated in FIG. 4 that shows a zoomed-in view of an excerpt of FIG. 3) in a portion 39 of the wall 34 interposed between the inner diameter 36 of restraining element 30 and respective proximate edges 40 of the pilot bolt holes 32 around restraining element 30.

Figure 8:
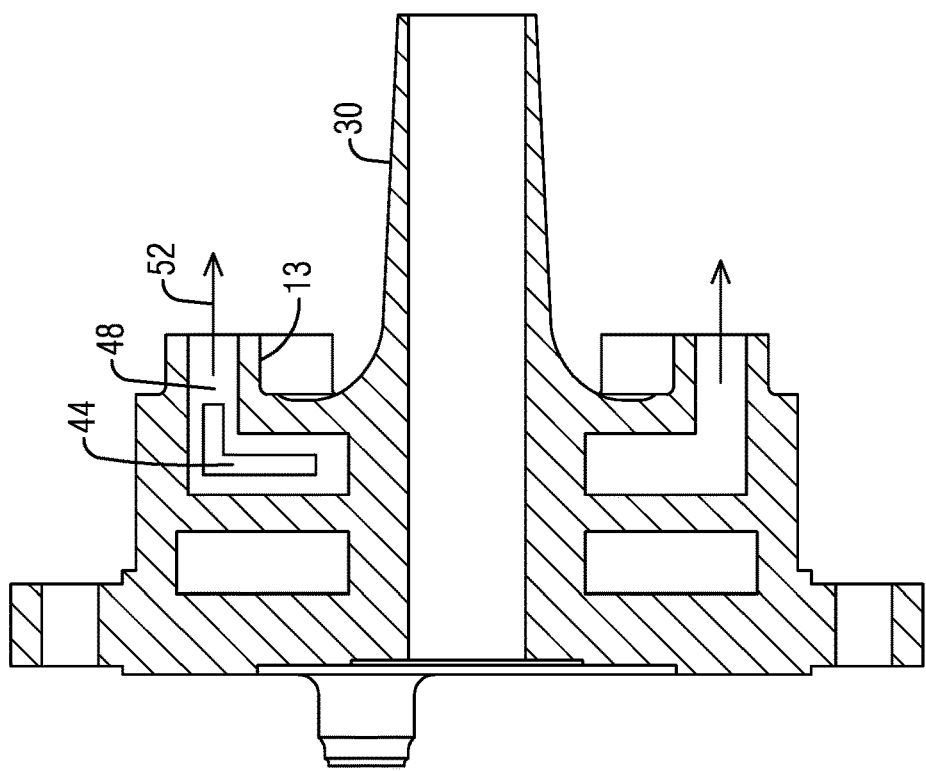
FIG. 8 is a cross-sectional view of one non-limiting embodiment of a disclosed fuel manifold along a cutting plane line 8-8 in FIG. 6 where a respective conduit in a rocket base can be additionally configured as a core-leaching conduit effective to remove the ceramic core.
Figure 7:
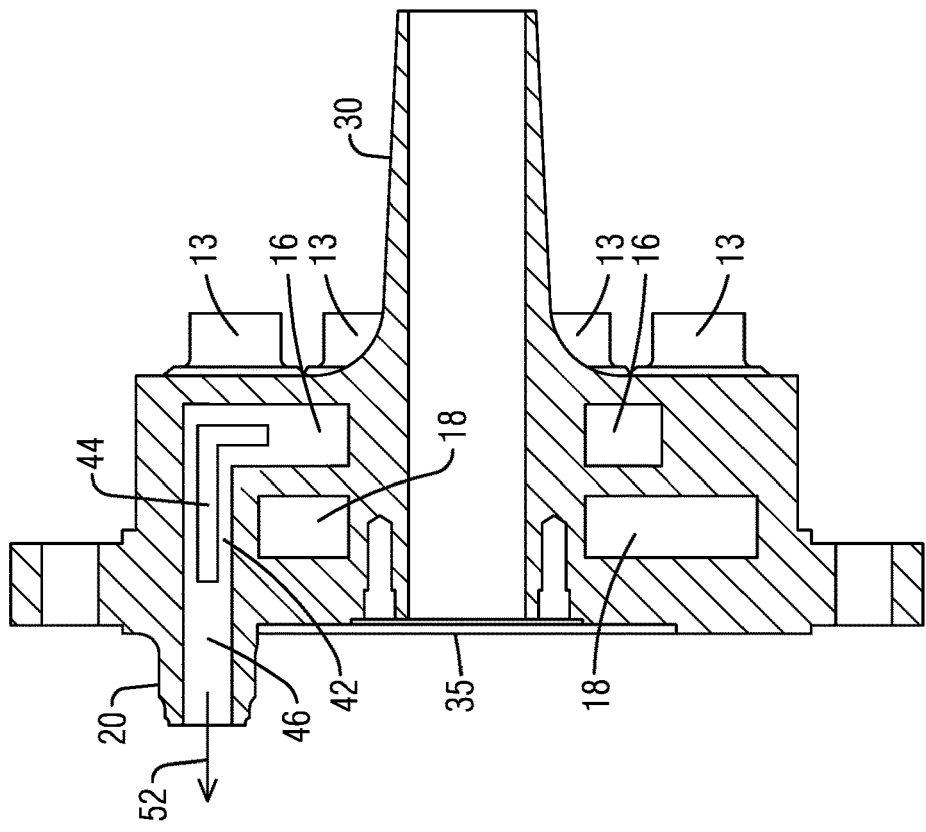
FIG. 7 shows the cross-sectional view illustrated in FIG. 3, where a respective conduit in the fuel feed boss may be configured as a core-leaching conduit effective to remove a ceramic core involved in a casting process for forming the fuel manifold.
Figure 9:
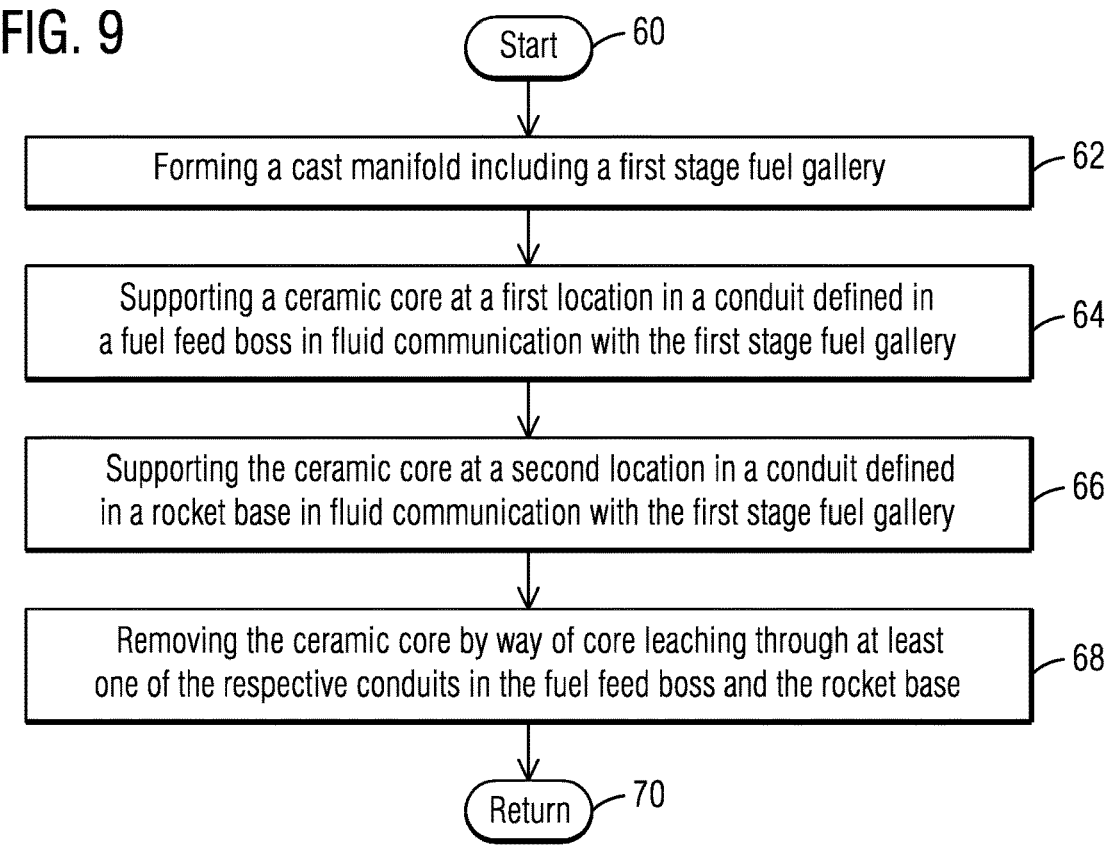
FIG. 9 illustrates flow chart of a disclosed casting method configured to form base support structure to support fuel nozzles in a combustor of a gas turbine engine.
Figure 10:
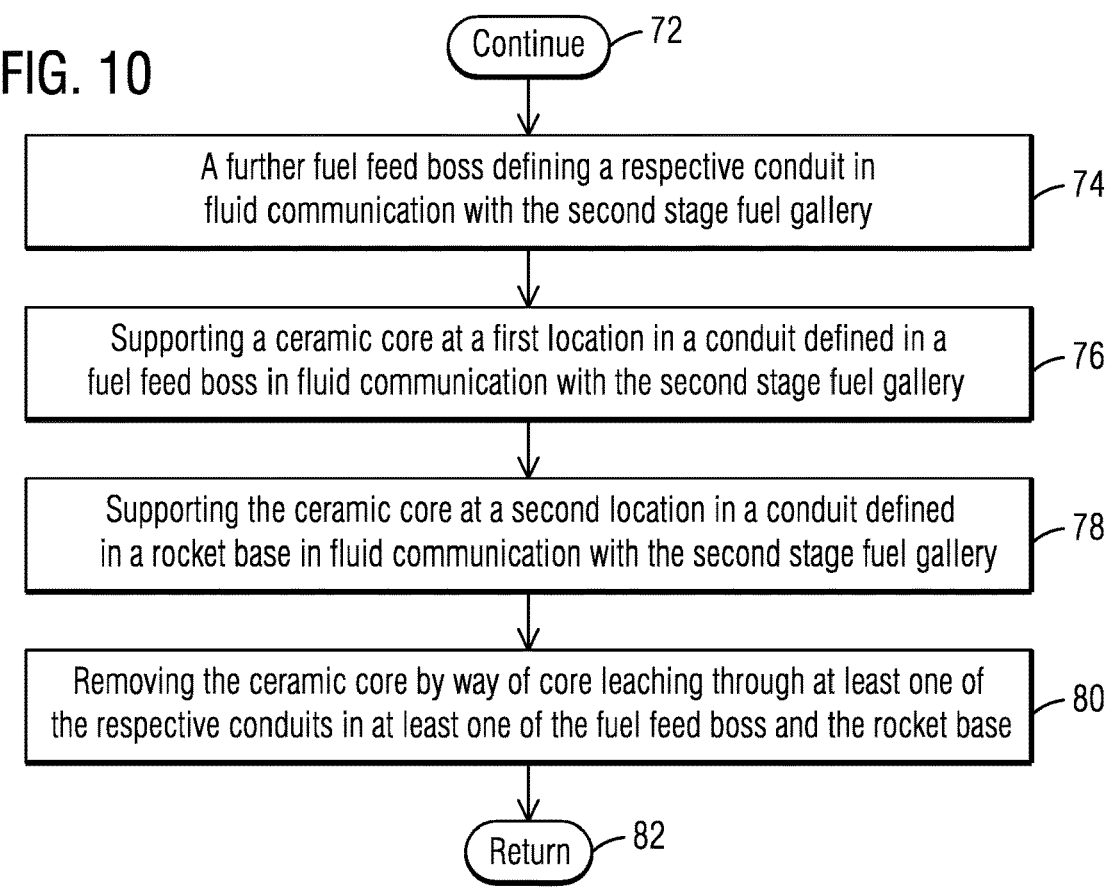
FIG. 10 illustrates further aspects of the disclosed casting method.

FIG. 9 is a flow chart of a disclosed casting method configured to form base support structure 12 (FIG. 1) used to support fuel nozzles 14 in a combustor of a gas turbine engine. Subsequent to a start step 60, step 62 allows forming a cast manifold including a first stage fuel gallery 16 (FIG. 7). Step 64 allows supporting a ceramic core 44 (FIG. 7) at a first location in a conduit 46 defined in fuel feed boss 20 in fluid communication with first stage fuel gallery 16. Step 66 allows supporting ceramic core 44 at a second location in a conduit 48 (FIG. 8) defined in a rocket base 13 in fluid communication with first stage fuel gallery 16. Prior to return step 70, step 68 allows removing the ceramic core by way of core leaching (schematically represented by arrows 52 in FIG. 7 and/or FIG. 8) through at least one of the respective conduits 46, 48 in fuel feed boss 20 and rocket base 13, respectively.

Figure 11:
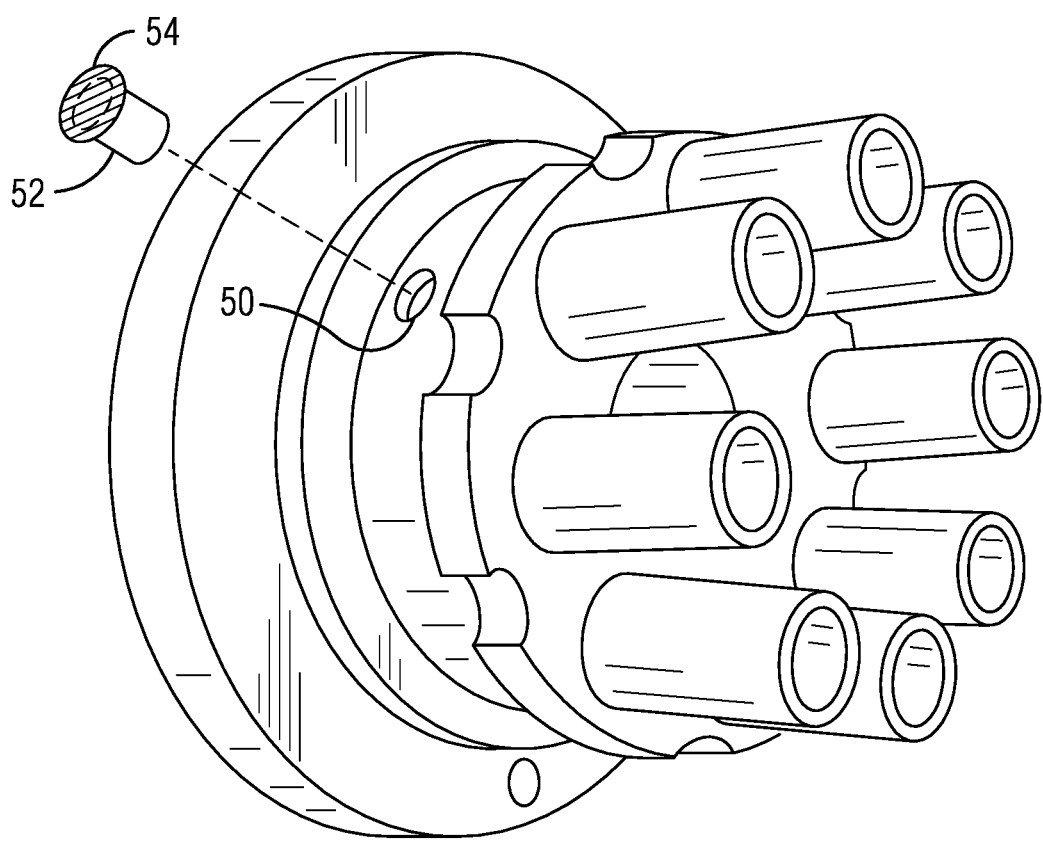
FIG. 11 is an isometric view of a prior art cast manifold including an exploded arrangement of a sealing plug and a weld for sealing holes that are formed in a casting method for making this prior art cast manifold.

Subsequent to continue step 72, similar to the foregoing steps in the context of first stage fuel gallery, step 74 allows supporting a further ceramic core at a first location in a conduit defined in a further fuel feed boss (e.g., fuel feed boss 22 (FIG. 2)) in fluid communication with a second stage fuel gallery 18 (FIG. 7). Step 76 allows supporting the further ceramic core at a second location in a conduit defined in a rocket base in fluid communication with the second stage fuel gallery. Prior to return step 80, step 78 allows removing the further ceramic core by way of core leaching through at least one of the respective conduits in at least one of the fuel feed boss and the rocket base in fluid communication with the second stage fuel gallery. It will be appreciated that in this disclosed method, the body of the cast manifold is advantageously free of extraneous holes 50 and thus free from plugs 52 and a weld 54 for sealing extraneous holes 50, as otherwise would be needed in the prior art cast manifold illustrated in FIG. 11. For simplicity of illustration, only one such hole is shown in FIG. 11; although in practice multiple such extraneous holes and associated plugs/welds are present in the prior art cast manifold.

Without limitation example materials that may be used include stainless steels and nickel-based alloys such as IN625 alloy, CN7M alloy, HastX alloy, Alloy20 alloy, etc. In operation, disclosed embodiments are expected to provide in a cost-effective manner a structurally robust base support structure to support fuel nozzles in a combustor of a gas turbine engine that should provide extended life.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the scope of the appended claims.

What is claimed is:

1. A method to form a fuel manifold, wherein the fuel manifold comprises:
 a base support structure configured to support a plurality of main fuel nozzles and a pilot fuel nozzle in a combustor section of a gas turbine engine;
 at least one fuel feed boss axially protruding at an inlet side of the base support structure, wherein said at least one fuel feed boss is integrally connected to the inlet side of the base support structure;
 a restraining element centrally arranged at a combustion side of the base support structure to support the pilot fuel nozzle, the combustion side of the base support structure opposite the inlet side of the base support structure, wherein the restraining element is integrally connected to the combustion side of the base support structure, wherein the restraining element extends along a longitudinal axis of the fuel manifold at a distance that protrudes beyond respective tips of rocket bases of the base support structure that support the main fuel nozzles, wherein the base support structure, the at least one fuel feed boss and the restraining element form a one-piece integral fuel manifold,
 wherein the method comprises a casting configured to form the one-piece integral fuel manifold,
 wherein the casting comprises:
 forming a stage fuel gallery in the fuel manifold, said at least one fuel feed boss in fluid communication with the stage fuel gallery;
 supporting a ceramic core in a conduit defined in said at least one fuel feed boss; and
 removing the ceramic core by way of core leaching through the conduit in said at least one fuel feed boss.

2. A method to form a fuel manifold, the method comprising:
 generating a computer-readable three-dimensional (3D) model of the fuel manifold, the model defining a digital representation comprising:
 a base support structure configured to support a plurality of main fuel nozzles and a pilot fuel nozzle in a combustor section of a gas turbine engine;
 at least one fuel feed boss axially protruding at an inlet side of the base support structure, wherein said at least one fuel feed boss is integrally connected to the inlet side of the base support structure;
 a restraining element centrally arranged at a combustion side of the base support structure to support the pilot fuel nozzle, the combustion side of the base support structure opposite the inlet side of the base support structure, wherein the restraining element is integrally connected to the combustion side of the base support structure, wherein the restraining element extends along a longitudinal axis of the fuel manifold at a distance that protrudes beyond respective tips of rocket bases of the base support structure that support the main fuel nozzles, wherein the base support structure, the at least one fuel feed boss and the restraining element form a one-piece integral fuel manifold; and manufacturing the fuel manifold in accordance with the generated three-dimensional model using an additive manufacturing process.

* * * * *